United States Patent [19]
Lee

[11] Patent Number: 6,144,886
[45] Date of Patent: Nov. 7, 2000

[54] METHOD FOR DETECTING LEADING EDGE OF PRINT MEDIUM

[75] Inventor: Dong-Yul Lee, Kyungki-do, Rep. of Korea

[73] Assignee: SamSung Electronics Co., Ltd., Suwon, Rep. of Korea

[21] Appl. No.: 09/109,406

[22] Filed: Jul. 2, 1998

[30] Foreign Application Priority Data

Jul. 2, 1997 [KR] Rep. of Korea ............ 97-30535
Jul. 21, 1997 [KR] Rep. of Korea ............ 97-33918

[51] Int. Cl.$^7$ .................................................. H04N 1/04
[52] U.S. Cl. .................................... 700/57; 358/497
[58] Field of Search .................. 358/497, 494, 358/488, 486, 1.5, 1.12; 700/124, 125, 57, 58, 59, 127, 128, 129, 186

[56] References Cited

U.S. PATENT DOCUMENTS

| | | | |
|---|---|---|---|
| 5,402,252 | 3/1995 | Kojima | 358/486 |
| 5,479,586 | 12/1995 | Gallagher et al. | 395/111 |
| 5,614,982 | 3/1997 | Yasukawa | 396/95 |
| 5,825,512 | 10/1998 | Okita | 358/496 |
| 6,002,495 | 12/1999 | Rombult et al. | 358/488 |

*Primary Examiner*—Thomas C. Lee
*Assistant Examiner*—Nitin Patel
*Attorney, Agent, or Firm*—Robert E. Bushnell, Esq.

[57] ABSTRACT

A method for detecting the leading edge of a sheet of print medium by driving a line feed motor at a predetermined speed; scanning and storing a data block of the sheet by slices; determining the leading edge of the sheet, based on the scanned and stored data; calculating sheet position according to the edge determination, and calculating a drive value of the line feed motor according to the sheet position; and second driving the line feed motor according to the calculated drive value. The data of the scanned data block is stored such that a scanning level of pixel data for a given horizontal line is regularly stored in an address memory, and the determining step searches for a boundary on which both near-absolute black and near-absolute white pixel data values are indicated in the scanning and storing step.

11 Claims, 1 Drawing Sheet

METHOD FOR DETECTING LEADING EDGE OF PRINT MEDIUM

CLAIM OF PRIORITY

This application makes reference to, incorporates the same herein, and claims all benefits accruing under 35 U.S.C. §119 from my applications entitled Method for Aligning and Detecting a Side End of Paper in Multifunction Peripherals and Paper Transferring Method of Multifunction Peripherals earlier filed with the Korean Industrial Property Office on the $2^{nd}$ day of July and on the Jul. 21, 1997 and there duly assigned Serial Nos. P97-30535 and P97-33918, respectively, by that Office.

BACKGROUND OF THE INVENTION

1. Field of the Invention

The present invention relates to computer peripheral processes and devices, such as a printer, facsimile machine or copier, providing image scanning functions and, more particularly, to processes and devices for detecting the leading edge of a sheet of printable medium (e.g., paper) in a computer peripheral device.

2. Discussion of Related Art

Along with recent trends in multimedia technology, common computer peripheral devices such as printers, have begun to incorporate scanner functions to complement desktop computer systems. In all such multi-function peripherals, a sheet of printable medium such as cut sheets of paper must be fed into the peripherals, and the leading edge of the sheet must be detected in order to determine the position of the sheet of paper in order to initiate the desired function, that is, either printing work, scanning work, or other task of image formation. Typically, a paper detection sensor is conventionally employed to sense the presence of the leading edge of the sheet, and an information signal is generated by the sensor to relay an indication of the detection. The information signal is applied as an electrical signal to a central processing unit (CPU), and the central processing unit generates a control signal to drive a line feed motor.

I have noticed that in such desktop systems, the central processing unit requires a dedicated input/output port to accommodate detection of the paper detection signal; this increases product cost and lowers the efficiency of the processor. I have also found that as paper detection sensors have proven to be inherently failure prone, there is the additional problem of reduced reliability and the concomitant inconvenience of replacement and repair of the system.

SUMMARY OF THE INVENTION

Accordingly, in order to overcome such drawbacks in the conventional art, it is therefore an object of the present invention to provide an improved process and apparatus for responding to the presence of a printable medium such as a cut sheet of paper.

It is another object to provide a process and apparatus able to use component elements dedicated to the performance of other functions of image formation and recognition, to detect the passage of the leading edge of a printable medium.

It is still another object to provide a process and apparatus that uses a scanner module, in lieu of a paper detection sensor, to detect the point at which a sheet of print medium reaches a work position.

It is yet another object to provide a process and scanner module to both detect the presence of an edge of a printable medium and to detect the presence on indicia of images formed on a surface of the printable medium.

To achieve these and other advantages and in accordance with the principles of the present invention, as embodied and broadly described, there is provided a process and apparatus for detecting the leading edge of a sheet of printable medium by the expedient of driving a line feed motor at a predetermined speed to advance the position of a printable medium; scanning and storing a data block of the sheet by slices; making an edge determination of the presence of the leading edge of the sheet, based on the scanned and stored data; determining the position of the sheet in accordance with the edge determination, and obtaining a drive value for operation of the line feed motor in accordance with the sheet position; and then driving the line feed motor according to the drive value.

In this process, the data of the scanned data block is stored so that a scanning level of pixel data for a given horizontal line is regularly stored in an address memory, and the step of edge determination searches for a boundary on which both near-absolute black and near-absolute white pixel data values are indicated during the step of scanning and storing.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein:

FIG. 1 is a flow chart showing the process performed in accordance with the principles of the present invention; and FIG. 2 is an explanatory view of the vertical scanning and rasterization of the slices of a block of letter-size print media.

DETAILED DESCRIPTION OF PREFERRED EMBODIMENT

In this specification, an example of scanning 2,551 slices is described, which corresponds to the maximum number of horizontal slices that may be obtained on the basis of a scanning resolution of 300 dpi across a sheet of standard letter-size print media. It should be appreciated that the present invention can be realized equally through the use of a fixed scanner module or a movable scanner module such as a shuttle.

Figure 1:
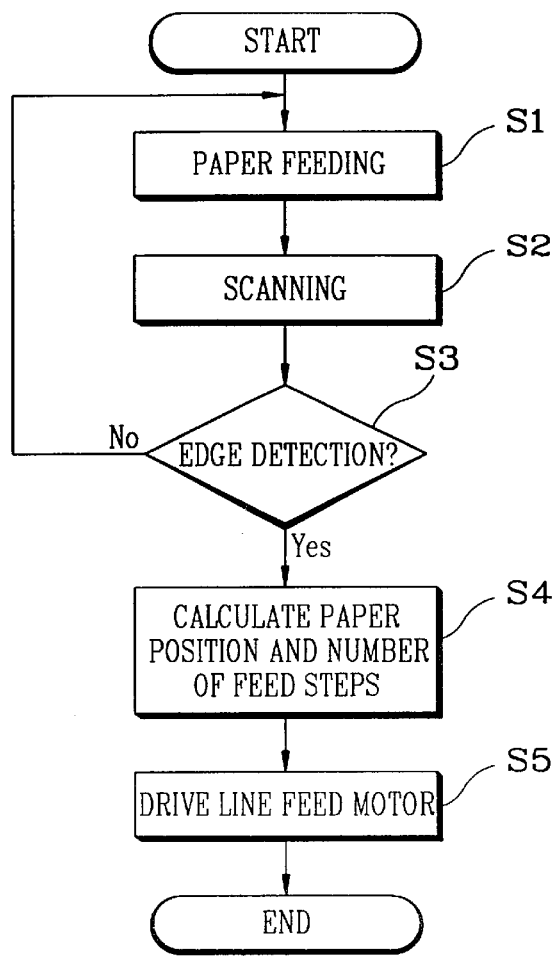

Referring to FIG. 1, in a step S1 for performing an initial feeding process, a command is received from a computer system in order to carry out a function such as printing or scanning in an image forming apparatus. Thus, a line feed motor is driven and a sheet of a print medium (e.g., paper or other substantially flat, thin and flexible material bearing images such as pictures, symbols or alphanumeric characters) is initially fed, and thus advanced along a path of conveyance through the image forming apparatus. The line feed motor is typically a stepper motor which, considering the optical sensor width (i.e., the slice length) of the scanner module, is accurately and minutely controlled in a manner that allows for sufficient precision in the transportation of the sheet so that the initial paper feeding does not overshoot the leading edge of the sheet. Overshoot would result in a failure to detect the edge by advancing the leading edge of the sheet through and beyond the slice length of the first data block.

Figure 2:
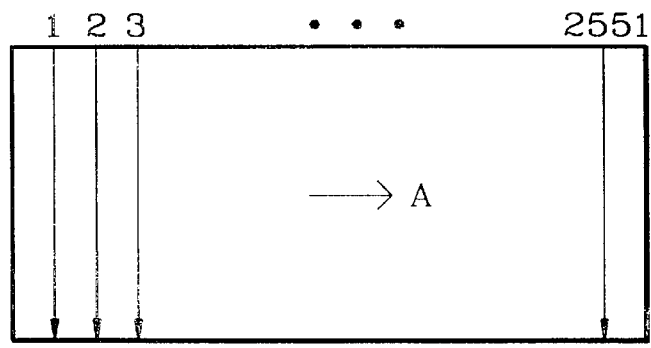

FIG. 2 shows a data block comprised of successive slices that have been scanned seriatim and rasterized in the "A" direction during step S2 in order to recognize (that is, to detect) the presence of an edge of the sheet. If, after scanning the first block, the scanning results show that edge detection has not enabled recognition of an edge, the controller determines that a line feed operation should be carried out again to advance the sheet farther along the path of conveyance, and the next data block is scanned and rasterized.

Assuming the traveling direction of a scanner module (or, in the event that a fixed scanner module is used, the rasterization) as the X axis, pixel data having corresponding Y-axis coordinates are stored regularly. The scanned data is stored as shown in the following table which shows an idealized example of the relative arrangement for the memory address storage of the data, given a slice length of 160 pixels.

In the present invention, if high speed sheet feeding is desired, only a few slices may be scanned. If, on the other hand, precise sheet feeding and alignment is desired, the entire block should be scanned so that an exact sheet position may be obtained. The above trade-off between feeding speed and precision is independent of whether a fixed scanner module or a movable scanner module is employed.

As described above, the present invention has an effect in that the leading edge detection is performed by using a scanner module, i.e., without using a paper detection sensor, in a multi-function peripheral having a scanner function. The exact work (printing, scanning, etc.) position is then calculated and a line feed motor is driven accordingly.

It will be apparent to those skilled in the art that various modifications can be made in the method of the present invention, without departing from the spirit of the invention. Thus, it is intended that the present invention cover such modifications as well as variations thereof, within the scope of the appended claims and their equivalents.

| 1st slice | | 2nd slice | | | 2.551st slice | |
|---|---|---|---|---|---|---|
| addr | data | addr. | data | ... | address | data |
| 0 | 00000000 | 160 | 00000000 | ... | 0 + (160 × 2550) | 00000000 |
| 1 | 00000000 | 161 | 00000000 | ... | 1 + (160 × 2550) | 00000000 |
| . | . | . | . | ... | . | . |
| . | . | . | . | | . | . |
| . | . | . | . | | . | . |
| 104 | 00000000 | 264 | 00000000 | ... | 104 + (160 × 2550) | 00000000 |
| 105 | 11111111 | 265 | 11111111 | ... | 105 + (160 × 2550) | 11111111 |
| . | . | . | . | ... | . | . |
| . | . | . | . | | . | . |
| . | . | . | . | | . | . |
| 159 | 11111111 | 319 | 11111111 | ... | 159 + (160 × 2550) | 11111111 |

As shown in the table, the first pixel of the first slice is stored at memory address 0000 and the first pixel of the second slice is stored at address 0160. That is, the pixel data of a given horizontal line (X axis) is stored in a regular manner.

Pixel data in the vicinity of an edge of the print medium is delineated by scanning the corresponding block. The pixel data for the same horizontal line and one which falls beyond the edges of the print medium will have a pixel data value of nearly black, that is, zero. For 8-bit scanning, absolute black will have a pixel value of 00000000 (0) and absolute white will have a pixel value of 11111111 (255). Accordingly, if a sheet of a print medium with an exposed surface that is white is being transported, the surface area of the document will have a value which approximates the level of absolute white.

By comparing the pixel data value on each horizontal line in one block, as in step S3, an edge (leading edge) will be a boundary on which both near-absolute black and near-absolute white pixel data values are indicated, which is shown in the above sample table as occurring between pixels 104 and 105 of the first slice. Likewise, sheet position can be calculated from the pixel data thus scanned on the same horizontal line, as an adjacent value of absolute black gives way to a succeeding and adjacent value of absolute white, so that, in step S4, the number of steps required for driving of the line feed motor can be carried out to an exact position for printing, scanning, or other operation upon the sheet. The sheet is fed to the predetermined work position in step S5, by driving the line feed motor by the calculated number of steps. According to the edge detection information, the driving direction of a line feed motor may be determined as required.

What is claimed is:

1. A method for detecting the leading edge of a sheet of print medium, comprising the steps of:
   first driving a line feed motor at a predetermined speed;
   scanning and storing a data block of said sheet by slices;
   determining the leading edge of said sheet, based on the scanned and stored data;
   calculating sheet position according to the edge determination, and calculating a drive value of the line feed motor according to the sheet position; and
   second driving the line feed motor according to the calculated drive value.

2. The method according to claim 1, wherein the data of the scanned data block is stored such that a scanning level of pixel data for a given horizontal line is regularly stored in an address memory.

3. The method according to claim 2, wherein the scanning level is separated into 256 levels.

4. The method according to claim 1, wherein said determining step searches for a boundary on which both near-absolute black and near-absolute white pixel data values are indicated in said scanning and storing step.

5. The method according to claim 1, wherein the predetermined driving speed of the line feed motor is set in accordance with a slice length of the scanned data block.

6. The method according to claim 1, wherein said second driving step is selectively carried out in the forward and reverse directions based on said edge determination.

7. The method according to claim 1, wherein said scanning is performed using a fixed scanner module.

8. The method according to claim 1, wherein said scanning is performed using a movable scanner module.

9. A method for detecting the leading edge of a sheet of print medium, comprising the steps of:

driving a line feed motor at a predetermined speed to incrementally advance a printable medium along a path of conveyance;

serially scanning and storing successive blocks of data at a location along said path said sheet by slices, as said line feed motor advances the printable medium along said path;

making a determination of the presence of the leading edge of the medium at said location by making sequential comparisons of scanned and stored data within said successive blocks;

determining a position of the medium on a basis of said edge determination, and determining determining a position of the medium on a basis of said edge determination, and determining a value for driving said line feed motor to control advancement of the medium along said path, in accordance with said position of the medium; and driving said line feed motor according to said value.

10. The method according to claim 9, wherein the data of the scanned data block is stored with a scanning level of pixel data for each horizontal line is regularly stored in an address memory.

11. The method according to claim 9, further comprised of using said scanning module to serially scan indicia of images borne by one surface of the medium as said line feed motor advances the medium along said path.

* * * * *